(12) United States Patent
Sharma et al.

(10) Patent No.: US 11,796,326 B1
(45) Date of Patent: Oct. 24, 2023

(54) AUTOMATED SYSTEM FOR GENERATING SAFETY TIPS FOR DRIVERS

(71) Applicant: Amazon Technologies, Inc., Seattle, WA (US)

(72) Inventors: Supriya Sharma, Seattle, WA (US); Beryl Tomay, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 379 days.

(21) Appl. No.: 16/891,813

(22) Filed: Jun. 3, 2020

(51) Int. Cl.
  *G01C 21/36* (2006.01)
  *G01C 21/34* (2006.01)

(52) U.S. Cl.
  CPC ..... *G01C 21/3407* (2013.01); *G01C 21/3661* (2013.01); *G01C 21/3691* (2013.01); *G01C 21/3697* (2013.01)

(58) Field of Classification Search
  CPC ............ G01C 21/3407; G01C 21/3661; G01C 21/3691; G01C 21/3697
  See application file for complete search history.

(56) References Cited

U.S. PATENT DOCUMENTS

| 11,062,341 | B2 | 7/2021 | Ramirez et al. |
| 2016/0223347 | A1 | 8/2016 | Ricci et al. |
| 2016/0371643 | A1* | 12/2016 | Parruck ................. H04W 4/029 |
| 2019/0303866 | A1* | 10/2019 | Baik ............... G06Q 10/08355 |

FOREIGN PATENT DOCUMENTS

| WO | WO-0235491 A1 * | 5/2002 | ............. G08B 25/08 |

\* cited by examiner

*Primary Examiner* — Kim T Nguyen
(74) *Attorney, Agent, or Firm* — Kilpatrick Townsend & Stockton LLP (57) ABSTRACT

An automated safety system for delivery associates is provided. The safety system determines safety hazards within a geographical region. Each safety hazard has an associated likelihood of causing a safety incident. The safety system retrieves delivery routes, where each delivery route indicates a travel path to one or more destination locations within the geographical region. The safety system generates safety notifications, based at least in part on the safety hazards within the geographical region and the delivery routes. The safety system transmits the safety notifications.

20 Claims, 8 Drawing Sheets

AUTOMATED SYSTEM FOR GENERATING SAFETY TIPS FOR DRIVERS

BACKGROUND

The present invention relates to automated computer systems, and more specifically, to automated systems for generating safety tips (or notifications) for delivery associates regarding potential risks on assigned delivery routes.

Retailers, wholesalers, and other product distributors typically maintain an inventory of various items that may be ordered, leased, borrowed, rented, viewed, and so forth, by clients or customers. For example, an e-commerce website may maintain inventory in a fulfillment center that can be ordered by various customers. When a customer orders an item, the item is picked from inventory, packed, and shipped to the customer. Today there are many package carriers and billions of people shipping packages on a regular basis. Similarly, these packages are shipped to a substantial number of different recipients and different delivery locations. This has resulted in an enormous combination of delivery locations and preferences for shipping packages to a given customer.

Delivery associates may be assigned delivery routes that direct them to several different delivery locations to deliver items. On a given route, a delivery associate may encounter several safety incidents (e.g., accidents, property damage, etc.) that can compromise the safety of the delivery associate and/or customers. Conventional techniques for notifying delivery associates of safety incidents generally rely on self-reporting mechanisms. For example, once a safety incident is identified, the incident can be reported and notified to other delivery associates. These conventional techniques are primarily reactionary and generally do not provide a sufficient amount of detail to inform delivery associates of the safety risks.

BRIEF DESCRIPTION OF DRAWINGS

Various embodiments in accordance with the present disclosure will be described with reference to the drawings, where like designations denote like elements.

DETAILED DESCRIPTION

As shipping activity continues to increase, it is becoming increasingly challenging to proactively identify and inform delivery associates of safety hazards that may be present on delivery routes. For example, a delivery associate traveling a route to a delivery location (e.g., residence) in order to deliver an item can encounter various different types of safety hazards, including weather hazards (e.g., thunderstorms, tornadoes, lightning, hail, wind, etc.), road hazards (e.g., unsafe road conditions, such as flooding, ice, road segments with low visibility, road segments with sharp turns, etc.), traffic hazards (e.g., limited parking, high pedestrian activity, etc.), animal hazards (e.g., aggressive dogs), biological hazards (e.g., disease outbreak, quarantine, etc.), and the like. Some of the safety hazards can be transient (or temporary) (e.g., an automobile accident) or persistent (e.g., a sharp turn on a particular road segment). In addition, some of the safety hazards can be location-specific (e.g., blind spots at a particular road segment, broken steps at a delivery location, limited parking, etc.).

As used herein, a safety hazard generally refers to one or more conditions that have the potential of becoming or causing a safety incident, which compromises the safety of delivery associates and/or customers. For example, a given safety hazard may have an associated likelihood of causing a safety incident. A safety incident generally refers to the occurrence of an accident, injury, property damage, (delivery) downtime, etc. Examples of safety hazards include, but are not limited to, existence of an aggressive animal at a particular location, a slippery road during a week of heavy snow, a road segment with a sharp turn, a road segment with reduced visibility, a bridge or overpass with a low clearance, etc. Some safety hazards may be transient (e.g., inclement weather during a period of time) or persistent (e.g., road segment with a sharp turn). In some cases, as described below, one or more driving behaviors, such as high speed, may be indicative of a safety hazard.

Further note a delivery route generally may refer to a route used for different types of operations, including, but not limited to, delivery operations, service operations, pickup operations, etc. For example, a delivery route may refer to a route for delivering items from a facility (e.g., fulfilment center) to one or more destinations (e.g., residence, business, etc.). In another example, a delivery route may refer to a route for picking up one or more items from a merchant and delivering the items to a facility (e.g., so that the items can be sold). In another example, a delivery route may refer to a route to one or more destinations for serving/assembling/installing one or more items (e.g., couch, television, bed, etc.) at the destination locations. Similarly, an electronic order as used herein may refer to an order for one or more items purchased from a retailer (and located at the retailer's facility), an order for items to be brought to a facility (from a merchant) and made available for shipping, an order to have items serviced/assembled/installed, etc.

Conventional safety systems generally rely on users (e.g., delivery associates, customers, etc.) to identify and self-report safety incidents. For instance, a delivery associate on route to a user's residence may identify an automobile accident on the route and notify an operator of the location of the automobile accident. In these scenarios, the safety incidents are reported in a reactionary manner (e.g., after the safety incident has occurred), which limits the ability to proactively notify delivery associates of safety hazards (that have the potential to become safety incidents). In addition, users that self-report safety incidents may not have complete information regarding the safety incident. Consequently, the notifications of such safety incidents to other users may not be sufficient to adequately warn delivery associates of the safety incident.

As such, embodiments described herein provide techniques for generating safety tips (also referred to as safety notifications or safety recommendations) for delivery associates regarding potential safety hazards (or risks) on assigned delivery routes. As described in more detail below, embodiments can obtain and evaluate different types of information for generating a set of safety tips. For example, the types of information can include, but is not limited to, information regarding driving behaviors (or patterns) of one or more delivery associates, information regarding safety hazards from one or more computing devices associated with delivery associates, information indicating environmental conditions in one or more geographical regions, feedback information from delivery associates regarding presence of safety hazards, etc.

In some embodiments, the computing system can evaluate the different types of information using one or more techniques (e.g., attribute matching, machine learning, predefined rules, etc.) to generate a set of safety tips. Each safety tip may include an indication of a safety hazard or a safety incident, the location of the safety hazard or safety incident, a recommendation (e.g., action or instruction) for the delivery associate regarding how to avoid the safety hazard or safety incident, etc. In some cases, the computing system can generate safety tips that are particular to a geographic region, based on an evaluation of the types of information. In some cases, the computing system can generate safety tips that are particular to a delivery associate (e.g., based on the delivery associate's driving patterns), based on an evaluation of the types of information. In some cases, the computing system can generate safety tips that are particular to a delivery route (e.g., driving route) of a delivery associate, based on an evaluation of the types of information. In general, the computing system can generate a safety tip based on any combination of attributes (e.g., geographic region, driving pattern, delivery route, delivery window, etc.).

In some embodiments, the computing system can transmit an indication of the safety tips to one or more electronic devices associated with the delivery associate. In some cases, the computing system can send a set of safety tips to the delivery associate prior to the delivery associate beginning a delivery route. In some cases, the computing system can send a set of safety tips to the delivery associate when the delivery associate is in proximity (e.g., with a threshold distance or range) of a safety hazard and/or safety incident. In this manner, embodiments can monitor several different types of information to identify safety hazards and safety incidents, and generate safety tips to proactively warn delivery associates of safety hazards and safety incidents. Doing so enables embodiments to improve the safety of delivery associates and customers, relative to conventional safety systems that operate primarily in a reactionary manner.

Figure 1:
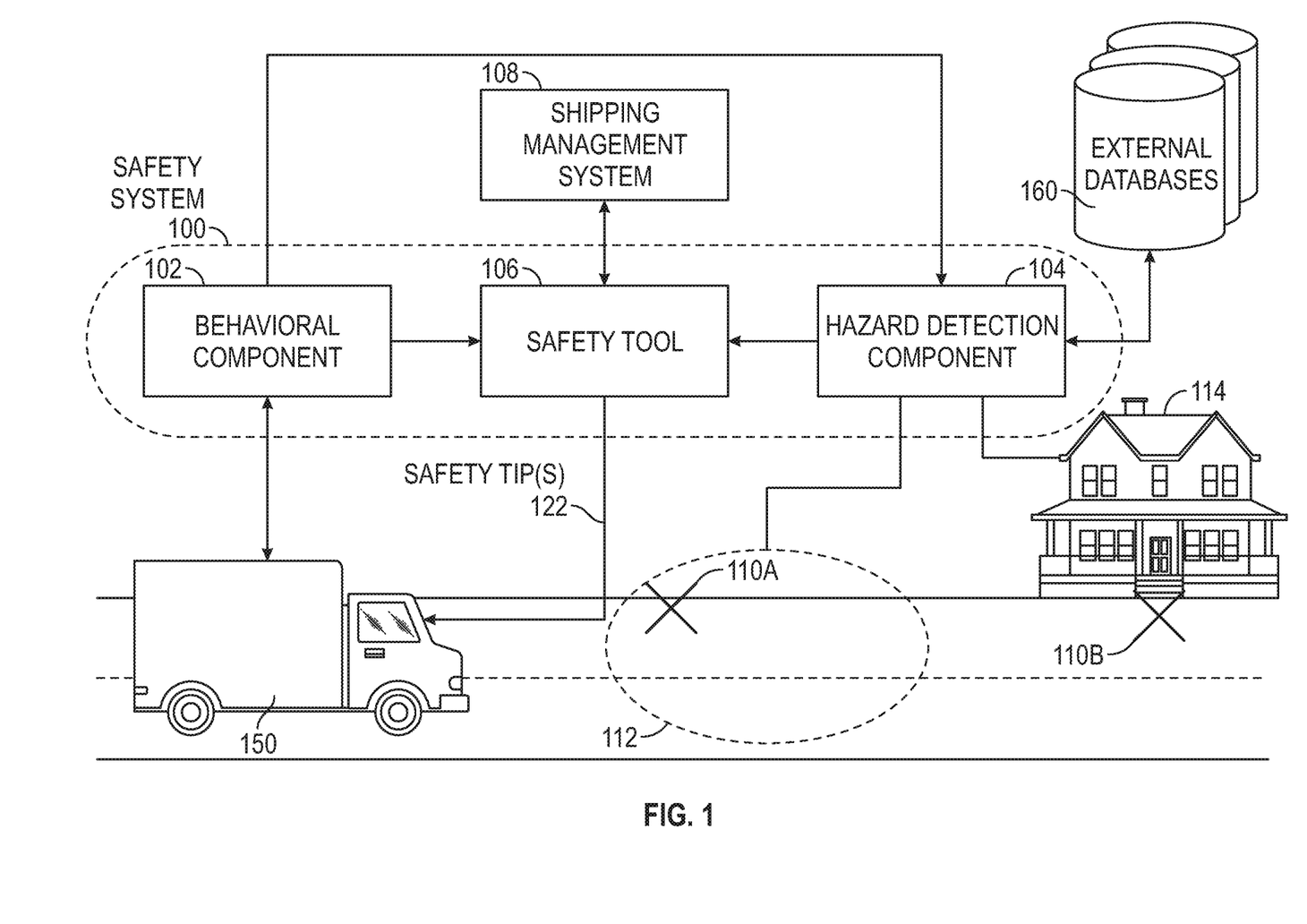
FIG. 1 is a block diagram illustrating an automated safety system, according to one embodiment.

FIG. 1 is a block diagram illustrating an automated safety system 100, according to one embodiment. In this example, a delivery associate may be driving a delivery vehicle 150 (e.g., truck, van, etc.) to a delivery location 114 (e.g., customer residence) in order to deliver an item(s) to the customer. In one embodiment, the safety system 100 can generate and provide safety tips 122 to the delivery associate to warn of one or more safety hazards 110A and 110B on the delivery route to the delivery location 114. As shown, the safety system 100 includes a behavioral component 102, a hazard detection component 104, and a safety tool 106.

In some embodiments, the behavioral component 102 can obtain data indicative of a delivery associate's driving pattern from one or more computing devices associated with the delivery associate. Such computing devices can include, for example, an electronic device (e.g., smartphone, tablet, watch, etc.) carried by the delivery associate, an electronic device in the delivery vehicle 150, delivery vehicle control system (e.g., on-board computer), etc. In one embodiment, the driving pattern data can indicate a current or average speed of the delivery vehicle 150, acceleration of the delivery vehicle 150 over a period of time, amount of hard braking of the delivery vehicle 150, when/where the parking brake of the delivery vehicle 150 is engaged, etc. In some embodiments, at least some of the driving pattern data can be obtained from the delivery vehicle control system. For example, the behavioral component 102 can retrieve diagnostic data, such as current speed, braking data, data indicating when the seatbelt was engaged/disengaged, etc., from the delivery vehicle control system via one or more ports (e.g., on-board diagnostics (OBD) ports) within the delivery vehicle 150. In general, the behavioral component 102 can interface with any computing device within the delivery vehicle 150 and/or carried by the delivery associate to retrieve data indicative of a driving pattern.

In some embodiments, the behavioral component 102 can obtain hazard information from delivery associates. For example, the behavioral component 102 may interact with a computing device used by the delivery associate and may allow a delivery associate to input information (via the computing device) regarding safety hazards encountered by the delivery associate. For instance, assuming the delivery associate encounters a high traffic area with multiple pedestrians on a particular route, the delivery associate can send information regarding the time of day and location of the high traffic area to the behavioral component 102 using a computing device. In another example, assuming the delivery associate passes through a road segment (of a delivery route) with flooding, the delivery associate can send information (e.g., location, time of day, etc.) regarding the particular road segment to the behavioral component 102 using a computing device.

In some embodiments, the hazard detection component 104 can detect safety hazards and/or safety incidents that may be present on delivery routes and provide information regarding the safety hazards and/or safety incidents to the safety tool 108. The hazard detection component 104 can detect different types of safety hazards, including, but not limited to, weather hazards, biological hazards, physical hazards, location specific hazards, etc. In some embodiments, the hazard detection component 104 can detect transient hazards (e.g., hazards that are present for a certain period of time) and/or permanent (or persistent) hazards.

In some embodiments, the hazard detection component 104 can detect a safety hazard based on receiving an indication of the safety hazard (e.g., from feedback from delivery associates). In other embodiments, the hazard detection component 104 can detect a safety hazard and/or safety incident based on learning (e.g., using one or more machine learning techniques) from information received from one or more computing devices. The hazard detection component 104 may receive this information from the behavioral component 102. For example, the behavioral component 102 may monitor sensors (e.g., accelerometer, gyroscope, global positioning system (GPS) sensor(s), etc.) on a computing device carried by the delivery associate and transmit sensor information to the hazard detection component 104. The hazard detection component 104 can evaluate the sensor information to determine if the delivery associate has encountered a safety hazard. For example, the sensor information may indicate whether the delivery associate has tripped or fallen in a particular location, potentially indicating a safety hazard, such as uneven steps, in that particular location. In some cases, the hazard detection component 104 may detect a safety hazard, based on the sensor information obtained from the computing devices of multiple delivery associates. For example, if the hazard detection component 104 detects, based on the sensor information from multiple delivery associates, that there is a particular location where multiple delivery associates have fallen, the hazard detection component 104 may determine that there is a safety hazard at the particular location.

In one embodiment, the hazard detection component 104 can access information from one or more databases 160 to determine safety hazards and/or safety incidents. For example, the hazard detection component 104 can retrieve information in a (first) database 160 containing weather information (e.g., various weather conditions, such as precipitation, dew point, humidity, wind, extreme weather warnings (tornado, hurricane, heavy flooding, mudslides, lighting, earthquake), etc.) and determine the weather hazards and/or weather incidents that are present in a given geographical region. In another example, the hazard detection component 104 can retrieve traffic information in a (second) database 160. The traffic information may indicate road closures, areas under construction, detours, traffic jams, accidents, etc. In yet another example, the hazard detection component 104 can obtain information emergency health related information from a (third) database 160. For instance, such health information can indicate whether there is a disease outbreak in a particular geographical region, emergency health precautions (e.g., quarantines, etc.) being implemented in a particular geographical region, etc. In general, the hazard detection component 104 can interface with and retrieve information from any computing system(s)/database(s) to determine safety hazards and/or safety incidents.

As shown in FIG. 1, in some embodiments, the safety system 100 may interact with a shipping management system 108. The shipping management system 108 generally includes data used in the management of shipping products to specified destinations. Such data could specify, for example, assigned delivery routes of one or more delivery associates, delivery history of a delivery associate, a current location of a given item, a location history of the item, timing information for when the item was scanned at various locations, an estimated time of delivery for the item, physical dimensions corresponding to the item, a weight of the item, and so on. In one embodiment described in more detail below, the safety tool 106 can access the data in the shipping management system 108 for generating safety tips 122.

Additionally or alternatively, in one embodiment, the safety tool 106 can update information in the shipping management system 108. For example, although not shown in FIG. 1, in some embodiments, the safety system 100 can interact with the shipping management system 108 to (re) assign delivery routes to delivery associates, based on the hazard information, driving patterns, etc. In one example, the safety system 100 may determine a safety rating for a delivery route, based on the hazard information, driving patterns, delivery associate feedback, etc. The safety system 100 may determine to (re)assign a delivery route to a delivery associate, based on the driving pattern for delivery associate and safety ratings for available delivery routes. In some cases, for example, the safety system 100 may assign a delivery associate with limited driving pattern history (e.g., the delivery associate may be a new driver) to delivery routes with high safety ratings. In general, the safety system 100 may adjust delivery routes assigned to delivery associates, so that delivery associates are assigned to the delivery routes with the highest safety ratings. In this manner, the safety system 100 can implicitly increase the safety of delivery associates by reducing the likelihood of delivery associates encountering safety incidents on delivery routes.

In some embodiments, the safety tool 106 generates safety tips regarding safety hazards and/or safety incidents, based on information obtained from the behavioral component 102, the hazard detection component 104, and/or the shipping management system 108. For example, for a given delivery associate, the safety tool 106 can determine a delivery route of the delivery associate from the shipping management system 108 and safety hazards and/or safety incidents that may be encountered on the delivery route from the hazard detection component 104. The safety tool 106 may then generate safety tips to warn the delivery associate of the safety hazards and/or the safety incidents that may be encountered on the delivery route. The safety tool 106 can provide a safety tip 122 to the delivery associate via one or more computing devices. The computing devices can include, e.g., a computing device carried by the delivery associate, a computing device within the delivery vehicle 150, etc. The safety tool 106 can send safety tips 122 to the delivery associate prior to a start of a delivery route, during the delivery route, and/or after the delivery route. In some embodiments, the safety tool 106 can send a safety tip 122 to the delivery associate upon determining that the delivery associate is in proximity (e.g., within a threshold distance) of a safety hazard 110.

As shown in FIG. 1, the safety system 100 may determine that there is a safety hazard 110A (e.g., flooding, sharp turn, etc.) in a first location 112 and a safety hazard 110B (e.g., limited parking, broken steps, children playing in the street, etc.) in a second location 114. Here, while the delivery associate is on a delivery route, the safety system 100 can send a first safety tip 122 to the delivery associate upon determining that the delivery vehicle is in proximity of the safety hazard 110A and can send a second safety tip 122 to the delivery associate upon determining that the delivery vehicle is in proximity of the safety hazard 110B. In this manner, the safety system 100 can proactively warn delivery associates of safety hazards and/or safety incidents on delivery routes.

Note that FIG. 1 illustrates merely a reference example of an environment in which the techniques presented herein for generating safety tips can be used and that the techniques presented herein can be used in other configurations of the automated safety system. For example, while FIG. 1 depicts the safety system 100 with three components (e.g., behavioral component 102, safety tool 106, and hazard detection component 104), the safety system 100 can include any number of components. In some embodiments, the safety system 100 can include the shipping management system 108. In some embodiments, one or more of the components of the safety system 100 can be located on a single computing system or on different computing systems. In some embodiments, one or more of the components may be distributed across one or more computing systems in a cloud computing environment.

Figure 2:
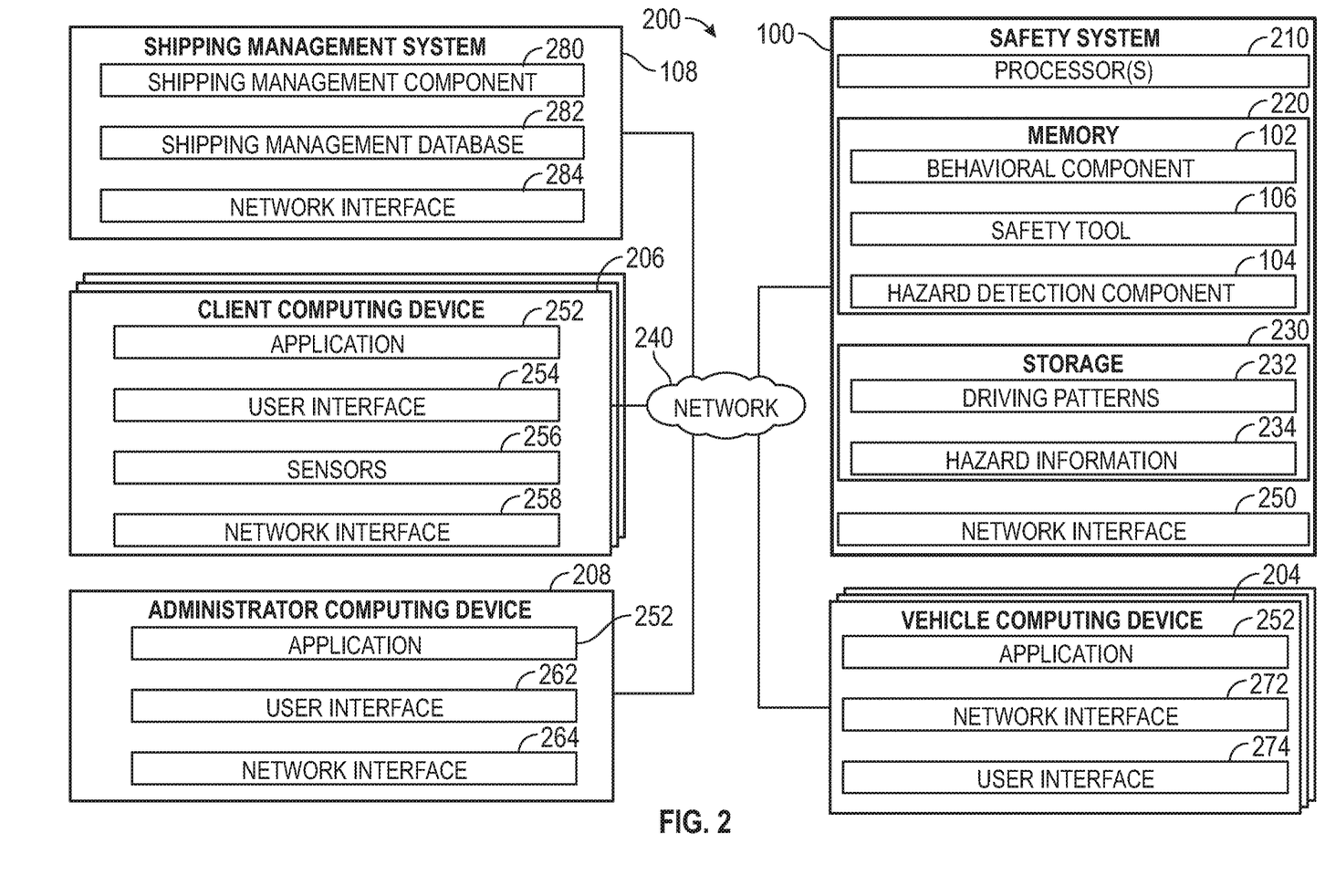
FIG. 2 is a block diagram illustrating an example network architecture for an automated safety system, according to one embodiment.

FIG. 2 is a block diagram of an example network architecture 200 for an automated safety system 100, according to one embodiment. The network architecture 200 includes the safety system 100, shipping management system 108, client computing device(s) 206, administrator computing device 208, and vehicle computing device(s) 204, which are interconnected via a network 240. The network 240, in general, may be a wide area network (WAN), a local area network (LAN) (e.g., Ethernet), a wireless LAN, a personal area network (PAN), a cellular network, etc. In a particular embodiment, the network 240 is the Internet.

The safety system 100 and the shipping management system 108 are representative of a variety of computing devices (or systems), including a laptop computer, mobile computer, server, etc. In one embodiment, one or more components of the safety system 100 and/or the shipping management system 108 may be distributed across multiple computing systems (e.g., in a data center, a cloud computing environment, etc.). Likewise, the client computing device(s) 206, administrator computing device 208, and the vehicle computing device(s) 204 are representative of a variety of computing devices (or systems), including a laptop computer, mobile computer (e.g., a tablet or a smartphone), etc.

The client computing device 206 includes an application 252, user interface 254, sensor(s) 256, and a network interface 258. The administrator computing device 208 includes the application 252, a user interface 262, and a network interface 264. The vehicle computing device(s) 204 include the application 252, network interface 272, and a user interface 274. Each of the network interfaces 258, 264, and 272 may be any type of network communications interface that allows the respective computing devices to communicate with other computers and/or components in the network architecture 200 via a data communications network (e.g., network 240). In some embodiments, the client computing device(s) 206 may be a handheld device (e.g., smartphone) that can be carried by a delivery associate and/or mounted within a delivery vehicle. In some embodiments, the vehicle computing device 204 may be a computing device that is fixed within the delivery vehicle. For example, the vehicle computing device 204 can be a touchscreen display device mounted to a dashboard of the delivery vehicle. In one embodiment, the vehicle computing device 204 may interface with a control system of a delivery vehicle, e.g., via one or more OBD ports. In some embodiments, the administrator computing device 208 can be used by an administrator or safety operator to manage one or more operations of the delivery associates.

The shipping management system 108 includes a shipping management component 280, a shipping management database 282, and a network interface 284. Although not shown, the shipping management system 108 may include processor(s), memory, storage, etc. The network interface 284 may be any type of network communications interface that allows the shipping management system 108 to communicate with other computers and/or components in the network architecture 200 via a data communications network (e.g., network 240).

The shipping management database 282 includes data used in the management of shipping products to specified locations. In one embodiment, such data can include attributes of items to be delivered to users (e.g., current location of an item, location history of the item, timing information for when the item was scanned at various locations, an estimated time of delivery for the item, promised delivery time for the item, physical dimensions corresponding to the item, weight of the item, and so on). In some embodiments, the data can also include attributes or information regarding delivery associates (e.g., list of delivery associates available to deliver items, current locations of delivery associates, driving patterns of delivery associates, delivery routes, delivery history of a delivery associate, etc.).

The shipping management component 280 generally uses information from the shipping management database 282 to facilitate delivery of items to delivery locations. For example, the shipping management component 280 can assign a delivery route to a delivery associate specifying a travel path to different destinations for the delivery associate to deliver ordered items. The shipping management component 280 may update information in the shipping management database 282 based on feedback from the delivery associate. For example, the shipping management component 280 can update the delivery route after a label on an item is scanned to indicate that the item was delivered. In one embodiment described below, the shipping management component can be configured to (re)-assign and/or update a delivery route for a delivery associate based on information received from the safety system 100.

The safety system 100 includes processor(s) 210, a memory 220 (e.g., volatile, non-volatile, etc.), storage 230, and a network interface 250. The storage 230 may be a combination of a fixed and/or removable storage, such as fixed disc drives, removable memory cards, optical storage, network attached storage (NAS), or storage-area-network (SAN). The network interface 250 may be any type of network communications interface that allows the safety system 100 to communicate with other computers and/or components in the network architecture 200 via a data communications network (e.g., network 240). Here, the storage 230 includes driving patterns 232 and hazard information 234, described in more detail below.

The memory 220 includes behavioral component 102, safety tool 106, and hazard detection component 104, each of which can include hardware and/or software components. As noted above, the behavioral component 102 can determine a driving pattern 232 of a delivery associate, based on information from computing devices received while the delivery associate is on a delivery route. The driving pattern 232 can include one or more driving attributes, such as average driving speed, amount of hard braking, driving acceleration, driving speed in certain locations (e.g., school zones, etc.), whether the parking brake is engaged in particular locations, whether a seatbelt is employed, and the like.

In some embodiments, the behavioral component 102 can also retrieve hazard information 234 from the delivery associates. For example, in one embodiment, the behavioral component 102 can receive an indication of a safety hazard (e.g., children playing on a street) and/or a safety incident (e.g., car accident) encountered by a delivery associate on a delivery route. In another embodiment, the behavioral component 102 can retrieve sensor information (that may be indicative of hazard information 234) from computing device(s) used by the delivery associate. The sensor information can be obtained when the delivery associate is within and/or outside of the delivery vehicle. When outside of a delivery vehicle, the sensor information may indicate, e.g., a location of the delivery associate, whether the delivery associate is running or walking, whether the delivery associate has fallen or tripped, etc.

The hazard detection component 104 generally detects the presence of safety hazards and/or safety incidents on delivery routes. As noted above, the hazard detection component 104 can detect safety hazards and/or safety incidents based on information obtained from one or more databases 160 (e.g., weather databases, traffic databases, etc.) and/or information obtained from the behavioral component 102. In some cases, the hazard detection component 104 can determine a safety hazard and/or safety incident, based on receiving an indication of the safety hazard and/or safety incident (e.g., based on feedback from one or more delivery associates). In other cases, the hazard detection component 104 can determine (or learn) a safety hazard and/or safety incident, based on sensor information obtained from the behavioral component 102.

The safety tool 106 generally generates safety tips, based on information received from the hazard detection component 104, behavioral component 102, and/or the shipping management system 108. In one embodiment, the safety tool 106 can generate a specific (or customized) safety tip for a delivery associate based on driving attributes of the delivery associate and the safety hazards and/or safety incidents identified for the delivery route of the delivery associate. For example, if the safety tool 106 determines that the delivery route includes a road segment with low visibility (below a threshold amount of visibility compared to other road segments), then the safety tool 106 may generate a safety tip that recommends reducing driving speed to "X" speed for that road segment. In another example, if the safety tool 106 determines that the delivery associate will stop at a delivery location at a time associated with high pedestrian activity, then safety tool 106 can generate a safety tip that instructs the delivery associate to take extra precaution at the delivery location. In yet another example, if the safety tool 106 determines that the delivery associate has a history of an unsafe driving behavior (e.g., speeding) on a certain road segment, the safety tool 106 can generate a safety tip instructing the delivery associate to mitigate the unsafe driving behavior (e.g., reduce speed) on the road segment. As used herein, an unsafe driving behavior may refer to a driving attribute that increases the likelihood of a safety hazard becoming a safety incident.

In some embodiments, the safety tool 106 can generate "general" safety tips (or recommendations) that are applicable to multiple delivery associates and/or a given geographical region. For example, the safety tool 106 may generate a first safety tip ("Remember to carry water") for delivery associates in a first geographical region that is expected to have high temperatures during the day, and may generate a second safety tip ("Remember to carry a rain jacket") for delivery associates in a second geographical region that is expected to have a large amount of precipitation during the day. In some embodiments, the safety tool 106 can send generalized safety tips to multiple delivery associates prior to the delivery associates starting their delivery routes, and then customized safety tips to particular delivery associates, based on their assigned routes and the safety hazards and/or safety incidents that may be present on the assigned routes.

The client computing device(s) 206, the administrator computing device 208, and/or the vehicle computing device(s) 204 are generally configured to host applications used to access the safety system 100 and/or the shipping management system 108. Here, for example, the client computing device 206, the administrator computing device 208, and the vehicle computing device 204 include an application 252. The application 252 is representative of a component of a client server application (or other distributed application) which can communicate with the safety system 100 and/or the shipping management system 108. Application 252 may be a "thin" client where the processing is largely directed by the application 252, but performed by components of the safety system 100 and/or components of the shipping management system 108. In some cases, the application 252 may be a conventional software application installed on the client computing device 206, the administrator computing device 208, and the vehicle computing device 204.

In one embodiment, the behavioral component 102, safety tool 106, and/or the hazard detection component 104 may be modeled as a service back-end (e.g., web server, application server, and database) and the application 252 may be modeled as a service front-end. Of course, other software architectures or distributed application frameworks could be used. For example, in general, the behavioral component 102, safety tool 106, and/or the hazard detection component 104 may be implemented using any suitable software programming language, application framework, web service solution stack, virtual application containers, etc., in order to provide safety tips and content to a user (e.g., delivery associate). In some examples, the behavioral component 102, safety tool 106, and/or the hazard detection component 104 may respond to requests from users (e.g., delivery associates) by generating hypertext markup language (HTML) and related content that can be passed to users and rendered as a user interface 254, 262, and 274. The content may include, for example, HTML components, code that generates HTML components, instructions executable by the computing devices 206, 208, 204 to display the respective user interfaces 254, 262, 274 (e.g., using language-specific or operating systems-specific application content), etc. In some cases, the application 252 could generate information (or application) content to present data retrieved from the shipping management system 108 and/or the safety system 100.

A user (e.g., delivery associate, administrator, etc.) can access the shipping management system 108 and/or the safety system 100, e.g., via the application 252. In one embodiment, the safety system 100 can provide (or present) one or more safety tips to a delivery associate on a user interface 254 and/or a user interface 274. In one embodiment, the safety system 100 can indicate the positions of safety hazards and/or safety incidents on the user interface(s) 254, 262, and 274. Similarly, the shipping management system 108 can provide delivery routes to delivery associates on the user interface 254 and/or the user interface 274. In some embodiments, a delivery associate can provide feedback regarding safety tips to the safety system 100 and/or an administrator via the application 252.

Figure 3:
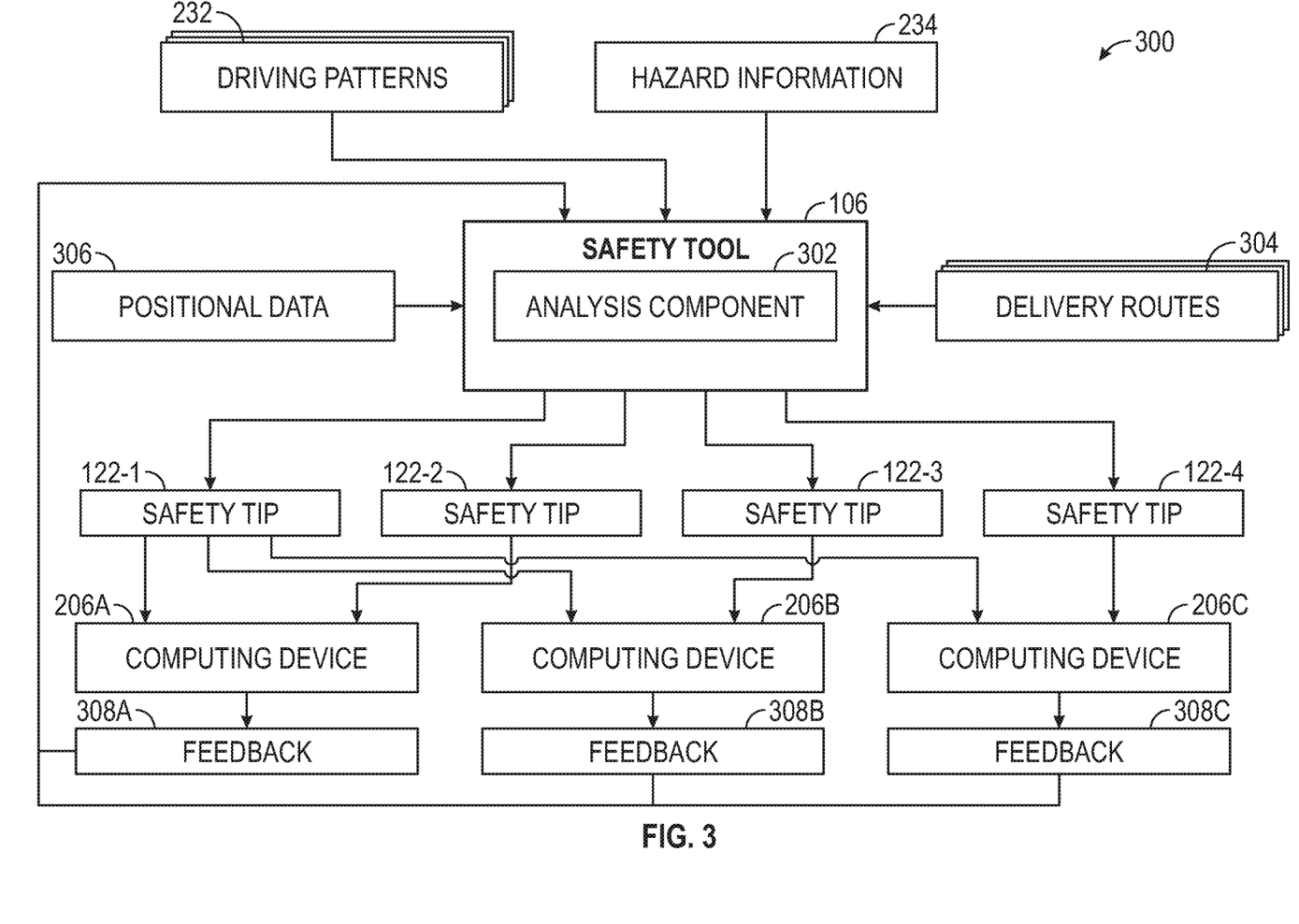
FIG. 3 illustrates an example workflow for generating safety tips, according to one embodiment.

FIG. 3 illustrates an example workflow 300 for generating safety tips for a delivery associate, according to one embodiment. The workflow 300 may be implemented by one or more components of the safety system 100. As shown, the workflow 300 depicts driving patterns 232, hazard information 234, positional data 306, and delivery routes 304 as inputs to the safety tool 106. The safety tool 106, which includes an analysis component 302, in turn, is configured to generate safety tips 122 1-4 based on the inputs.

For example, the safety tool 106 (using the analysis component 302) can evaluate the driving patterns 232 to determine one or more driving attributes of delivery associates. In some cases, the driving attributes may indicate whether a particular delivery associate has a history of unsafe driving behaviors (e.g., speeding, hard braking, disengaged seatbelt, excessive acceleration, etc.). In one embodiment, the analysis component 302 can consider the driving attributes of a particular delivery associate in the context of a specific situation (e.g., particular delivery route) to determine which safety tip 122 to generate for that delivery associate. As an example, assuming a delivery associate has a tendency to speed on certain types of road segments (e.g., u-turns, sharp turns, etc.), the safety tool 106 can generate a safety tip 122 to instruct the delivery associate to reduce speed for those types of road segments that may be on the delivery associate's delivery route 304. In some cases, the safety tip 122 may recommend the delivery associate to adjust speed to a particular speed below the speed limit (e.g., 10 miles below speed limit) for that road segment, based on the particular safety hazard (e.g., low visibility, u-turn, etc.). In another example, if the safety tool 106 determines that the delivery associate is not using the parking brake when stopped or is not wearing a seatbelt when driving, then the safety tool 106 can generate a safety tip to remind the delivery associate to use these safety features.

Additionally, the safety tool 106 can evaluate hazard information 234 to determine different types of safety hazards and/or safety incidents may be present on one or more of the delivery routes 304. For example, in general, the hazard information 234 can indicate safety hazards that are transient (e.g., exist for a limited period of time) or safety hazards that are persistent (or permanent). The safety tool 106 can evaluate the different types of safety hazards in the context of the delivery routes 304 to determine particular safety tips 122 to send to delivery associates. For example, assuming the delivery associate is delivering an item to a delivery location (e.g., house) with a persistent safety hazard (e.g., aggressive dog), the safety tool 106 can generate a safety tip 122 warning the delivery associate of the persistent safety hazard at the delivery location. In another example, if the analysis component 302 determines that the delivery associate will encounter a transient safety hazard on a delivery route, the safety tool 106 can generate a safety tip 122 warning the delivery associate of the transient safety hazard on the delivery route. In some cases, the safety tip 122 may be an instruction to avoid the safety hazard. For example, assuming the delivery associate is scheduled to deliver to a location on a delivery route that is currently experiencing severe weather (e.g., hail event), the safety tool 106 can generate a safety tip 122 instructing the delivery associate to avoid that location until the severe weather event has passed. In some cases, the safety tip 122 may instruct the delivery associate to go to another location (e.g., under a bridge) until the severe weather event is over.

Additionally, the safety tool 106 (using the analysis component 302) can evaluate the positional data 306 in the context of the hazard information 234 and delivery routes 304 when determining when to provide safety tips 122 to delivery associates. For example, the safety tool 106 may send a safety tip 122 to a particular delivery associate upon determining that the delivery associate is within proximity (e.g., within a threshold distance) of a safety hazard and/or safety incident, based on the positional data 306. In some examples, the analysis component 302 can send location-specific safety tips 122 to delivery associates in a particular geographical region, based on the positional data 306. The safety tool 106 can retrieve the positional data 306 from sensors (e.g., GPS) of the computing device (e.g., computing device 206) carried by the delivery associate and/or the computing device (e.g., computing device 204) within the delivery vehicle.

The safety tool 106 can use a variety of techniques to generate safety tips 122. In one embodiment, the safety tool 106 (via the analysis component 302) can generate the safety tips 122 1-4 by selecting the safety tips 122 1-4 from a larger set of (pre-configured) safety tips 122, based on the inputs. For example, the safety tool 106 can employ attribute matching techniques (or other similar techniques) to determine the safety tips 122 1-4. In another embodiment, the safety tool 106 can employ machine learning techniques to determine the safety tips 122 1-4. In yet another embodiment, the safety tool 106 can determine the safety tips 122 1-4, based on a predetermined set of rules. For example, an administrator could specify one or more rules that can be used for determining safety tips 122 based on a set of inputs. In general, the safety tool 106 can be configured with logic to evaluate various inputs to determine the safety tips 122 1-4. The safety tool 106 can update the logic (e.g., rules, machine learning algorithm, etc.) used for determining the safety tips, based on feedback 308, hazard information 234, driving patterns 232, etc.

In this particular embodiment, the safety tool 106 generates safety tips 122 1-4. The safety tip 122-1 may be a general safety tip that is applicable to multiple delivery associates. Here, the safety tip 122-1 is sent to multiple (e.g., three) delivery associates via the computing devices 206 A-C. In one example, the safety tip 122-1 may be a reminder to delivery associates to bring water prior to starting a delivery route in a geographical region with a hot climate. In another example, the safety tip 122-1 may be a reminder to delivery associates that will traverse the same particular road segment to avoid the road segment because of safety hazards and/or safety incidents on the road segment. In yet another example, the safety tip 122-1 may be a general reminder to delivery associates that have a history of the same unsafe driving behaviors to mitigate those driving behaviors prior to starting their delivery routes.

The safety tips 122 2-4 may be specific safety tips generated for different delivery associates. Here, for example, the safety tip 122-2 is sent to the computing device 206A (for a first delivery associate), the safety tip 122-3 is sent to the computing device 206B (for a second delivery associate), and the safety tip 122-4 is sent to the computing device 206C (for a third delivery associate). As noted above, in some cases, each of the safety tips 122 2-4 may be based on a particular driving pattern 232, particular safety hazard and/or safety incident, and/or a particular delivery route 304.

In some embodiments, the safety tool 106 can also consider feedback 308 A-C from one or more delivery associates in generating safety tips 122. In some cases, the feedback 308 can include an indication of whether the delivery associate has acknowledged the safety tip 122. For example, if the safety tool 106 determines that a particular delivery associate has not acknowledged a safety tip 122 (within a period of time), the safety tool 106 may determine to re-transmit the safety tip 122 and/or generate another type of safety tip 122. In some examples, if the safety tool 106 determines, based on the feedback 308, that a type of safety tip (e.g., a type of presentation on computing device, such as a particular format, phrasing, etc.) has a higher likelihood of being acknowledged by delivery associates in a particular geographic region, then the safety tool 106 can determine to use that safety tip type for delivery associates in the geographic region.

Figure 4:
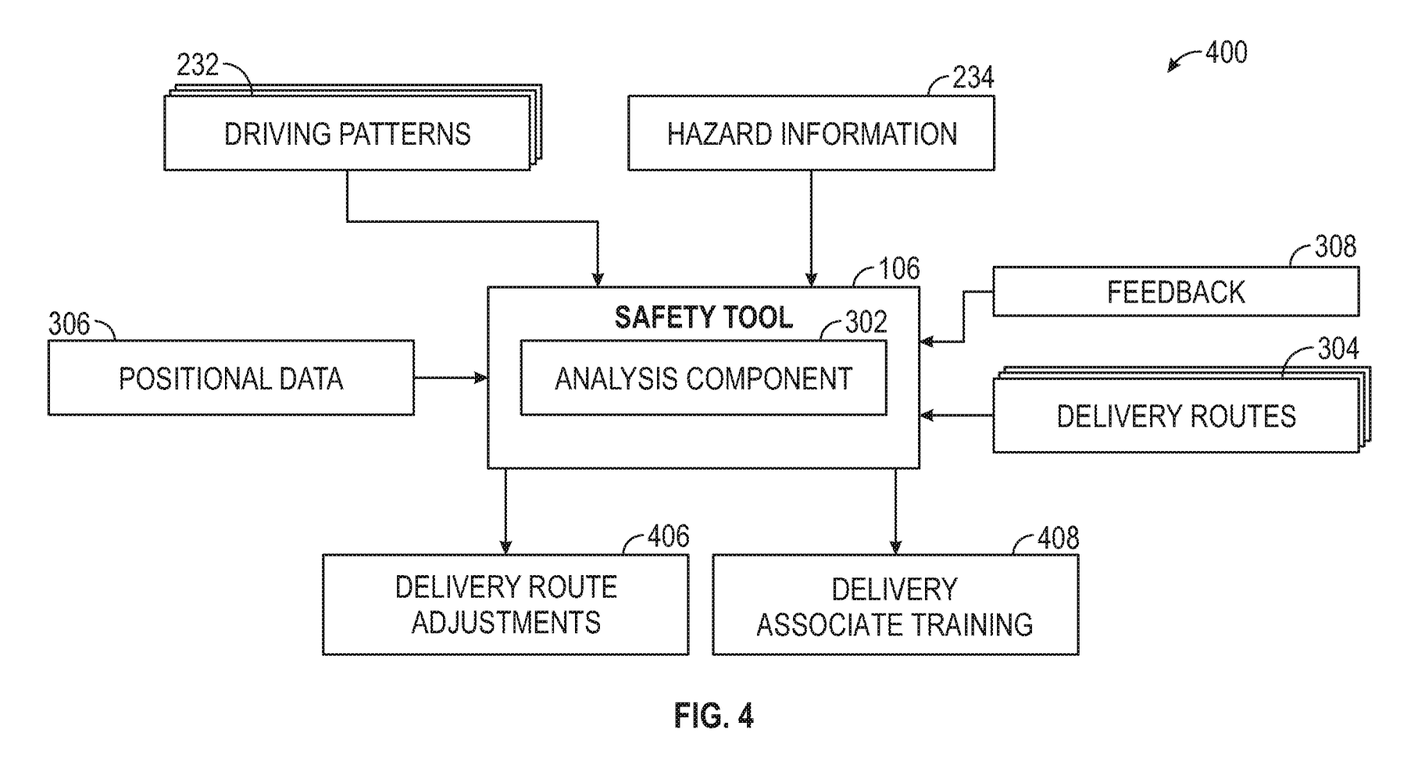
FIG. 4 illustrates an example workflow for determining an adjustment to a delivery route, according to one embodiment.

Additionally or alternatively, the safety tool 106 can be configured to adjust delivery routes and/or recommend route (re)assignments, based on an evaluation of the input information. FIG. 4, for example, illustrates a workflow 400 for determining delivery route adjustments, according to one embodiment. In this embodiment, the workflow 400 depicts driving patterns 232, hazard information 234, positional data 306, delivery routes 304, and feedback 308 as inputs to the safety tool 106, which determines one or more delivery route adjustments 406, based on an evaluation of the inputs. As used herein, a delivery route adjustment 406 can include a route assignment, a route re-assignment, an adjustment of one or more portions of an assigned route, etc.

In one embodiment, the safety tool 106 can determine a delivery route adjustment 406 for a delivery associate based on the delivery route 304 for the delivery associate and the hazard information 234 for that delivery route 304. For example, if the safety tool 106 determines that the delivery associate will encounter a transient safety hazard (e.g., extreme weather event, limited parking during rush hour, children playing on street during a certain time) on a delivery route, the safety tool 106 can determine a route adjustment that bypasses the transient safety hazard. In another example, if the safety tool 106 determines that a particular road segment on a delivery route has a higher incidence of accidents than expected (e.g., above a threshold number of accidents), then the safety tool 106 can generate delivery route adjustments for the delivery routes that include that road segment.

In another embodiment, the safety tool 106 can determine a delivery route adjustment 406 for a delivery associate based on the feedback 308 from the delivery associate. For example, if the feedback 308 from the delivery associate indicates that the delivery associate has maintained an unsafe driving behavior (after receiving a safety tip), the safety tool 106 can generate a delivery route adjustment 406 reassigning the delivery associate to another delivery route. In another example, if the feedback 308 indicates that the delivery associate has not acknowledged a number of safety tips (e.g., above a threshold), the safety tool 106 can generate a delivery route adjustment 406 for that delivery associate.

In another embodiment, the safety tool 106 can determine (or recommend) route assignments as part of the delivery route adjustment 406. For example, the safety tool 106 can implicitly assign a delivery route to a delivery associate, based on the safety rating associated with the delivery route and, if available, the driving pattern 232 for the delivery associate. Assuming that a delivery associate has a limited driving pattern history, for example, the safety tool 106 can recommend a delivery route with a high safety rating (e.g., above a particular threshold rating). In another example, assuming that the safety tool 106 identifies a delivery route with a low safety rating (e.g., below a particular threshold rating), the safety tool 106 can recommend that the delivery associates be reassigned from that delivery route and/or recommend that the delivery route should not be assigned to delivery associates.

In some embodiments, the safety tool 106 can generate delivery associate training information 408 for a delivery associate, based on an evaluation of the input information. In some cases, the delivery associate training information 408 may be specific to a delivery associate and based on a previous safety hazard and/or safety incident encountered by the delivery associate and/or other delivery associates. For example, if the delivery associate previously encountered a road hazard (e.g., sharp turn on a road segment), the delivery associate training information 408 may include safety information regarding how to approach the road hazard. In some cases, the delivery associate training information 408 may be provided to the delivery associate (e.g., via computing devices 204, 206, etc.) and may coach/train the delivery associate on how to manage particular safety hazards identified for the delivery route. In some cases, the delivery associate training information 408 may be provided to an administrator (e.g., via administrator computing device 208), which can use the delivery associate training information 408 to coach and train a delivery associate regarding how to manage safety hazards and/or safety incidents. The delivery associate training information 408 may be provided proactively to a delivery associate prior to the delivery associate encountering the particular safety hazards and/or safety incidents on a delivery route.

Figure 5:
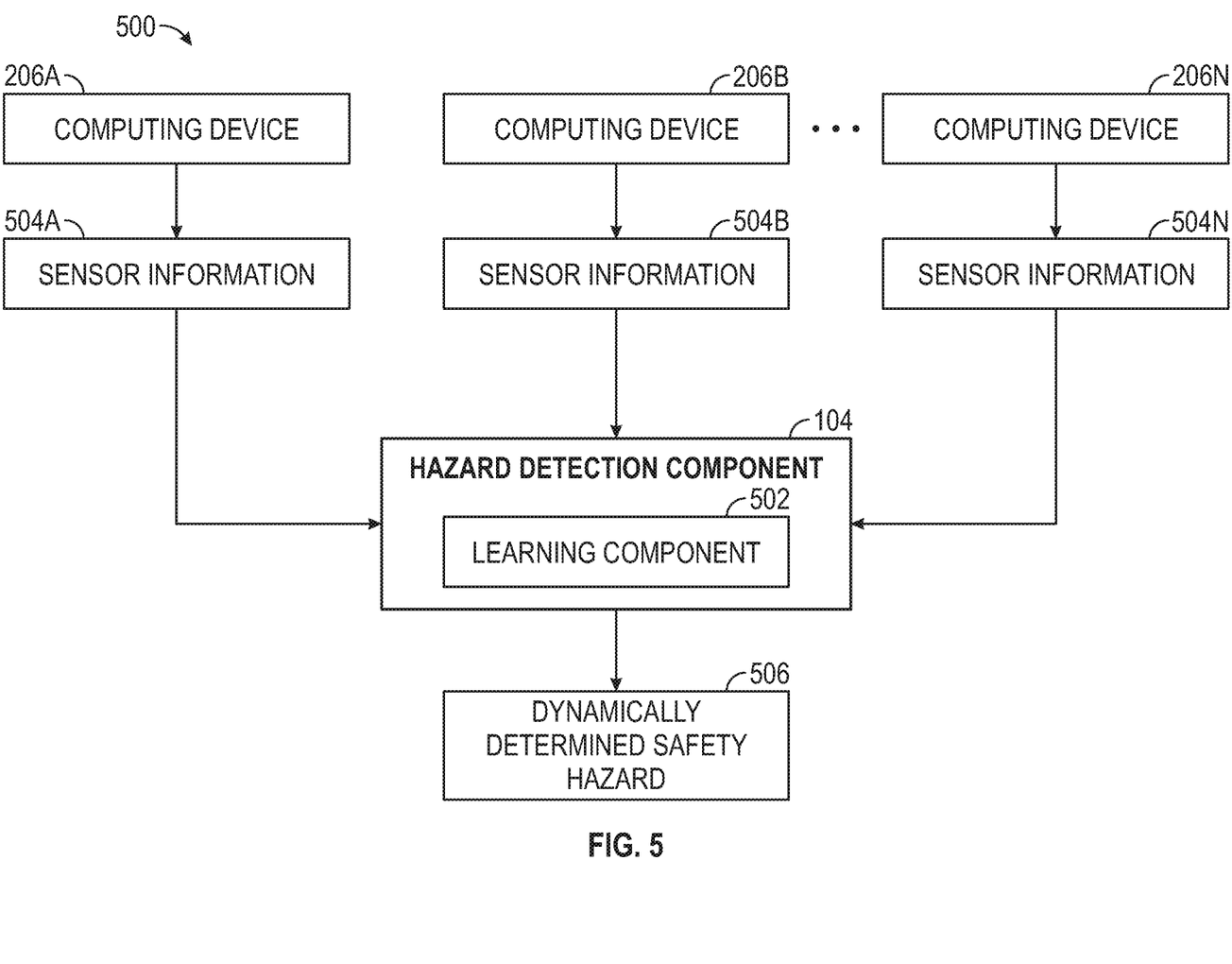
FIG. 5 illustrates an example workflow for learning a safety hazard, according to one embodiment.

FIG. 5 illustrates an example workflow 500 for learning the presence of safety hazard, based on sensor information from multiple computing devices, according to one embodiment. As noted above, rather than receiving an indication of a safety hazard from a user, the safety system 100 can be configured to dynamically learn whether a safety hazard is present on a delivery route, based on sensor information received from delivery associate computing devices.

As shown in this embodiment, the hazard detection component 104 receives sensor information 504 A-N from respective computing devices 206 A-N. The sensor information 504, in general, may indicate whether the respective delivery associate is running or walking, whether the delivery associate has fallen or tripped, etc. In one example, if the hazard detection component 104 determines, from the sensor information 504, that a number of delivery associates (above a threshold) have fallen in the same location, the hazard detection component 104 may determine that the location has a safety hazard 506 (e.g., the location may have an uneven surface that can cause accidents). In another example, if the hazard detection component 104 determines, from the sensor information 504, that a number of safety incidents (e.g., above a threshold) have occurred in the same location, the hazard detection component 104 may determine that the location has a safety hazard 506.

Figure 6:
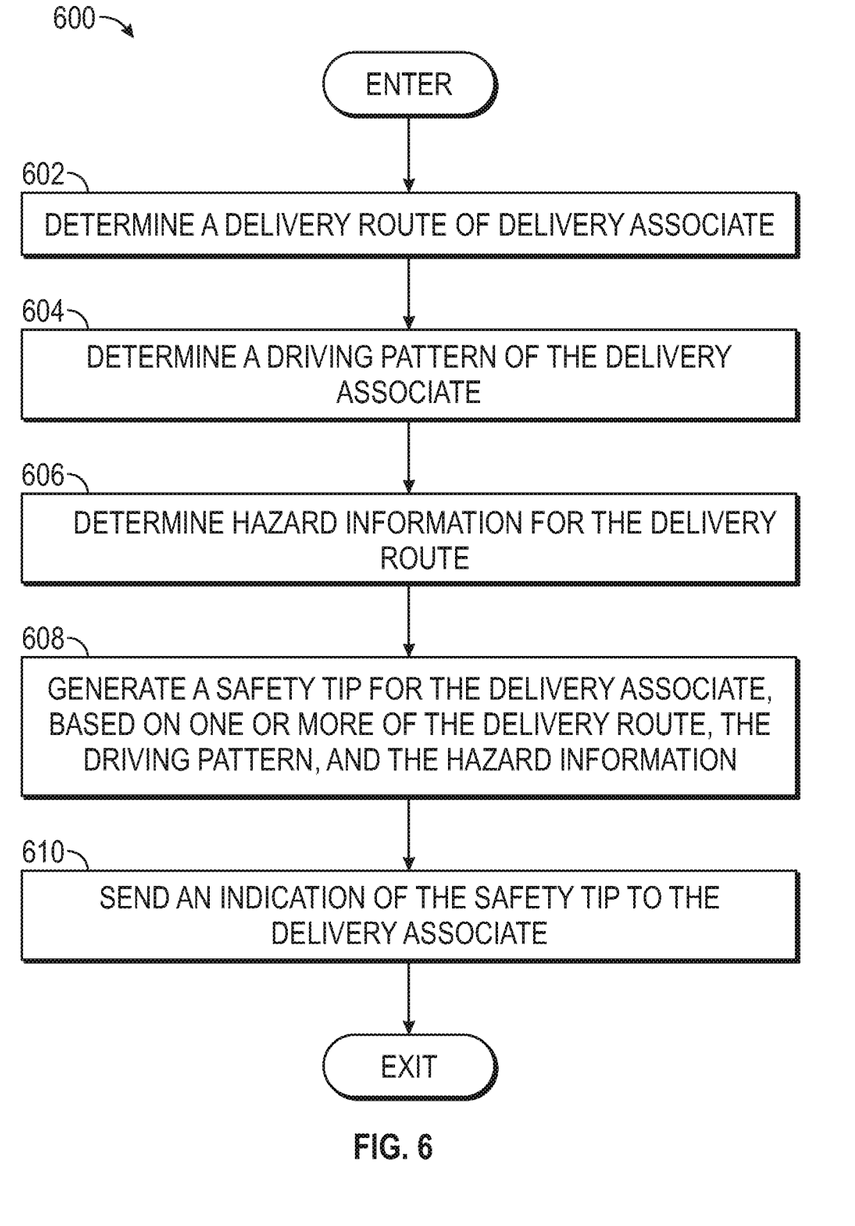
FIG. 6 is a flowchart of a method for generating safety tips, according to one embodiment.

FIG. 6 is a flowchart of a method 600 for generating safety tips, according to one embodiment. The method 600 may be performed by a safety system (e.g., safety system 100). As shown, the method 600 may enter at block 602, where the safety system determines a delivery route (e.g., delivery route 304) of a delivery associate. At block 604, the safety system determines a driving pattern (e.g., driving pattern 232) of the delivery associate. At block 606, the safety system determines hazard information (e.g., hazard information 234) for the delivery route.

At block 608, the safety system generates a safety tip (e.g., safety tip 122) for the delivery associate, based at least in part on the delivery route, driving pattern, and the hazard information. For example, if the hazard information indicates that a road segment on the delivery route has a high amount of pedestrian traffic during a certain time period, the safety system can generate a safety tip that indicates this information to the delivery associate prior to the delivery associate encountering the road segment. In this manner, the delivery associate can be proactively notified of the pedestrian activity on the delivery route. In another example, if the hazard information indicates that a particular delivery location on a delivery route has a safety hazard (e.g., broken steps), the safety system can generate a safety tip warning the delivery associate of the safety hazard. In some embodiments, in addition to notifying the delivery associate of the safety hazard, the safety tip may recommend (or instruct) the delivery associate take a course of action to mitigate the risk of a safety incident (e.g., accident) due to the safety hazard. For example, assuming the safety hazard is the presence of broken steps at a delivery location, the safety tip can recommend that the delivery associate carry a flashlight (e.g., assuming there will be low illumination at the scheduled time of delivery) to reduce the likelihood of the delivery associate falling on the broken steps.

In another embodiment, if the driving pattern indicates that the delivery associate has a certain unsafe driving behavior (e.g., speeding), the safety system can generate a safety tip to remind the delivery associate to mitigate the driving behavior. In yet another embodiment, if the driving pattern indicates that the delivery associate is not wearing a seatbelt or does not have a parking brake engaged while parked, the safety system can generate a safety tip in real-time reminding the delivery associate to wear the seatbelt or engage the parking brake.

At block 610, the safety system sends an indication of the safety tip to the delivery associate. In some embodiments, the safety system can provide a list of the safety tips to the delivery associate prior to the delivery associate starting a delivery route. In some embodiments, the safety system can provide an indication of the locations of the safety hazards associated with the safety tips on a geographical map. In some embodiments, the safety system can send an indication of the safety tip when the delivery associate is in proximity to the safety hazard and/or safety incident. In some cases, the safety tip can be presented on a user interface (e.g., user interface 254, user interface 274) and/or via an audio sensor (e.g., microphone) on a computing device (e.g., client computing device 206, vehicle computing device 204).

Figure 7:
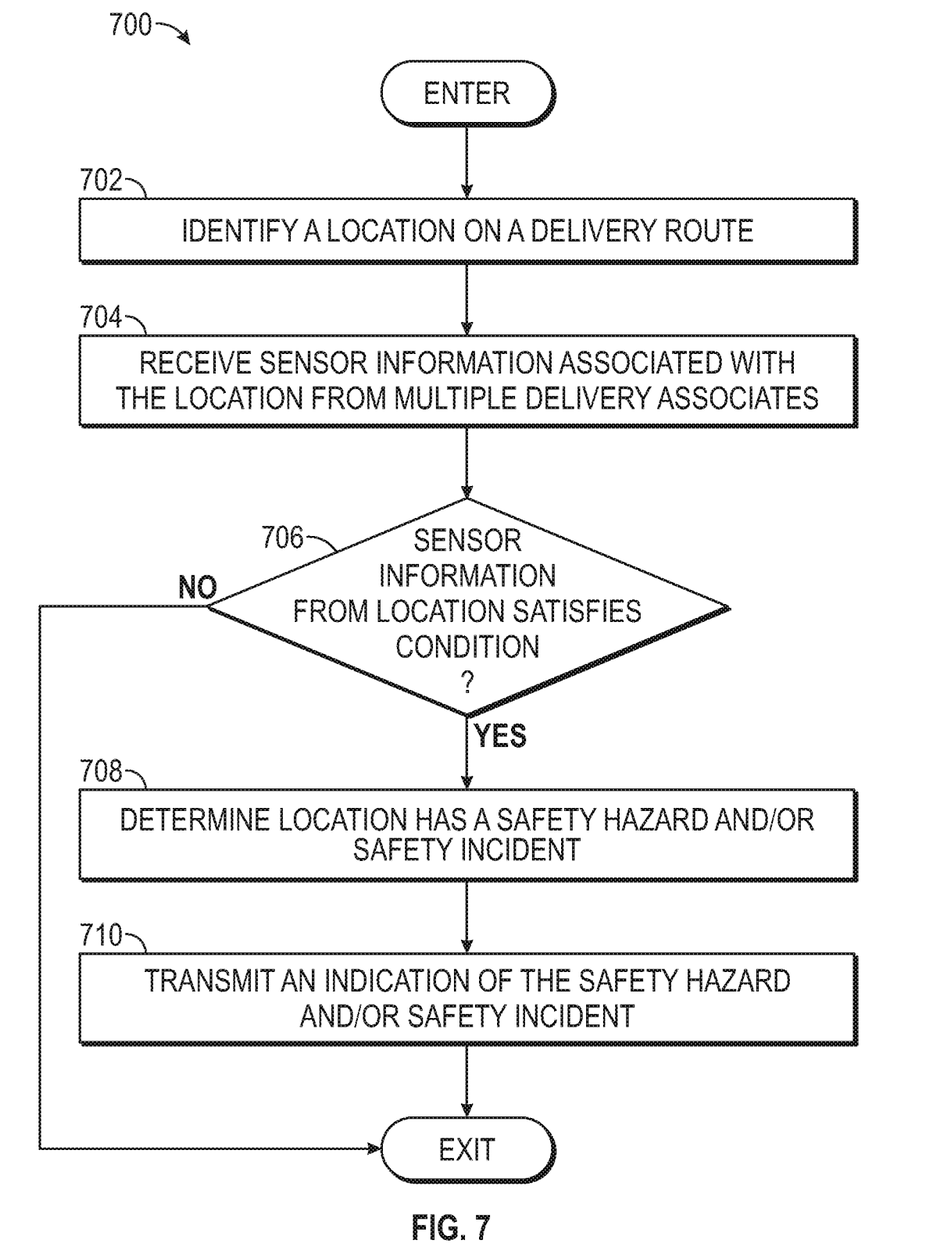
FIG. 7 is a flowchart of a method for dynamically determining a safety hazard, according to one embodiment.

FIG. 7 is a flowchart of a method 700 for dynamically determining (or learning) the presence of safety hazard, according to one embodiment. The method 700 may be performed by a safety system (e.g., safety system 100).

The method 700 may enter at block 702, where the safety system identifies a location on a delivery route (e.g., delivery route 304). At block 704, the safety system receives sensor information (e.g., sensor information 504) associated with the location from multiple delivery associates. For example, the safety system may receive sensor data from accelerometers of multiple computing devices 206 of multiple delivery associates when the computing devices 206 are at the location on the delivery route.

At block 706, the safety system determines whether the sensor information associated with the location satisfies one or more conditions. For example, the safety system may determine whether the sensor information indicates that a threshold number of delivery associates have fallen at the location. In another example, the safety system may determine whether sensor information from at least one of the delivery associates indicates a safety incident (e.g., a vehicular accident).

If the sensor information satisfies the conditions, then the safety system determines that the location has a safety hazard and/or safety incident (block 708). At block 710, the safety system transmits an indication of the safety hazard and/or the safety incident. In the case of a safety incident, for example, the safety system can automatically transmit an alert and request for assistance to emergency personnel to help the delivery associate and/or other users. If at block 706, the safety system determines the sensor information does not satisfy the condition(s), the safety system may determine the location does not have a safety hazard and/or safety incident. The method 700 may then exit.

Figure 8:
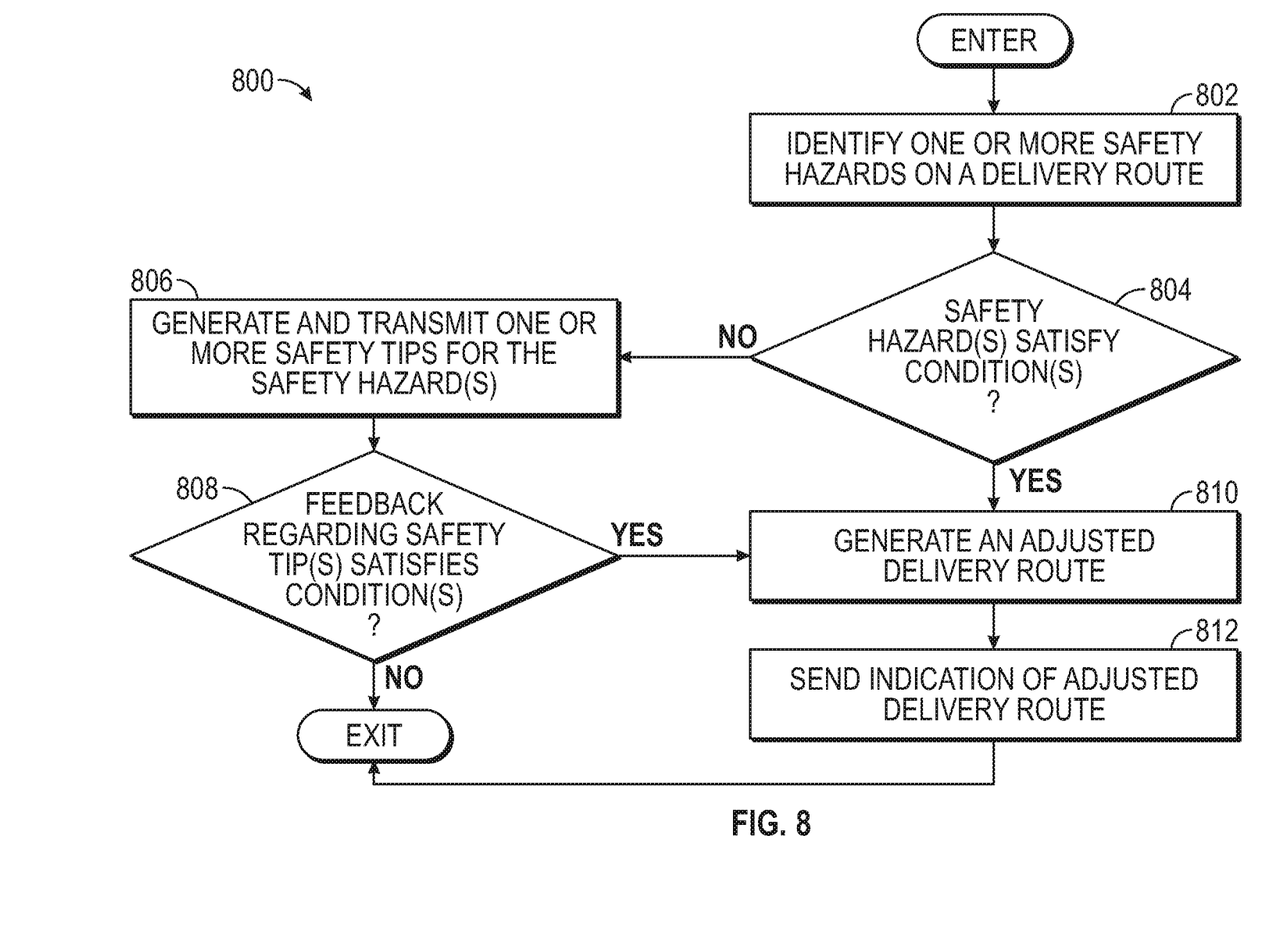
FIG. 8 is a flowchart of a method for adjusting a delivery route, according to one embodiment.

FIG. 8 is a flowchart of a method 800 for adjusting a delivery route, according to one embodiment. The method 800 may be performed by a safety system (e.g., safety system 100). The method 800 may enter at block 802, where the safety system identifies one or more safety hazards on a delivery route (e.g., delivery route 304). At block 804, the safety system determines whether the safety hazard(s) satisfy one or more (first) conditions. For example, the (first) conditions may include at least one of: whether a number of safety hazards is above a threshold, whether a number of safety incidents is above a threshold, whether a certain type of safety hazard (e.g., extreme weather event, road closure, etc.) or type of safety incident (e.g., accident) is detected, and the like.

If the safety system determines the (first) conditions are satisfied, then the safety system generates an adjusted delivery route (e.g., delivery route adjustment 406) (block 810). At block 812, the safety system sends an indication of the adjusted delivery route. On the other hand, if the safety system determines the (first) conditions are not satisfied, then the safety system generates and transmits one or more safety tips for the safety hazards to the delivery associate (block 806).

At block 808, the safety system determines whether feedback regarding the safety tip(s) satisfies (second) conditions. In one embodiment, for example, the (second) conditions may include absence of an acknowledgment of a threshold number of safety tips within a threshold amount of time after transmitting the safety tips. In another embodiment, the (second) conditions may include an indication that an indicated safety hazard has turned into a safety incident. If the safety system determines that the feedback satisfies the (second) conditions, then the safety system proceeds to block 810. Otherwise, the method 800 may then exit.

Note that the method 800 in FIG. 8 is one example implementation for adjusting a delivery route. In other implementations, a safety tip may be generated independently of whether a safety hazard satisfies a predetermined condition. For example, in some cases, a safety tip can always be generated to proactively warn delivery associates of safety hazards (e.g., regardless of whether the safety hazard satisfies a condition). In some cases, a safety tip can be generated regardless of any indication of a safety hazard. For example, the safety tip can include general safety information and/or coaching/training information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., safety tool 106) or related data available in the cloud. For example, the safety tool 106 could execute on a computing system in the cloud and generate one or more safety tips to warn of safety hazards and/or safety incidents on delivery routes. In such a case, the safety tool 106 could store the generated safety tips at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system, comprising:
   a processor; and
   a memory containing a program, which when executed on the processor, performs an operation comprising:
      receiving a delivery route specifying at least a plurality of destination locations associated with one or more items belonging to a plurality of electronic orders;
      determining, based on first sensor data received from a plurality of electronic devices, a safety hazard located at one of the plurality of destination locations, wherein the safety hazard has a likelihood of causing a safety incident comprising at least one of an accident, injury, or property damage at the one of the plurality of destination locations;
      receiving location information from an electronic device associated with a user assigned to the delivery route, the location information indicating a device location of the electronic device and being generated by the electronic device based on second sensor information generated by the electronic device;
      generating a safety notification based on the device location being within a threshold distance of the safety hazard, the safety notification comprising information associated with the safety hazard; and
      transmitting the safety notification to the electronic device prior to the user encountering the safety hazard.

2. The system of claim 1, wherein the information comprises at least one of: (i) an indication that the safety hazard is located at the one of the plurality of destination locations; (ii) a type of the safety hazard; or (iii) a duration of the safety hazard.

3. The system of claim 1, the operation further comprising determining at least one driving attribute of the user, based on a driving pattern associated with the user, wherein the information comprises an instruction to change the at least one driving attribute of the user at the one of the plurality of destination locations.

4. The system of claim 1, the operation further comprising determining a safety rating for a particular delivery route at least based on one or more information associated with one or more safety hazards associated with the particular delivery route and a driving pattern associated with the user.

5. The system of claim 4, the operation further comprising:
   generating a recommendation based on the safety rating being above a safety threshold, the recommendation comprising information associated with the particular delivery route, and
   transmitting the recommendation to the electronic device associated with the user prior to the user encountering a first safety hazard along the particular delivery route.

6. The system of claim 4, wherein the particular delivery route is the delivery route.

7. A computer-implemented method comprising:
   determining a plurality of safety hazards within a geographical region, each of the plurality of safety hazards having an associated likelihood of causing a safety incident;
   retrieving a plurality of delivery routes, each of the plurality of delivery routes indicating a travel path to one or more destination locations within the geographical region;
   generating a plurality of safety notifications for one or more users, based at least in part on the plurality of safety hazards within the geographical region and the plurality of delivery routes, comprising, for at least a first user assigned to a first delivery route:
      determining at least a first safety hazard located on the first delivery route;
      receiving location information from a computing device associated with the first user assigned to the first delivery route, the location information indicating a device location of the computing device and being generated by the computing device based on sensor information generated by the computing device; and
      generating a first safety notification based on the device location being within a threshold distance of the first safety hazard, the first safety notification comprising information associated with the first safety hazard; and
   transmitting the plurality of safety notifications, comprising transmitting the first safety notification to the computing device prior to the first user encountering the first safety hazard.

8. The computer-implemented method of claim 7, wherein determining that the first user will encounter the first safety hazard comprises determining that the first safety hazard is a permanent safety hazard.

9. The computer-implemented method of claim 7, wherein determining that the first user will encounter the first safety hazard comprises:
   determining that the first safety hazard will be present at a location along the first delivery route for a period of time; and
   determining, based on the first delivery route, that the first user will encounter the location within the period of time.

10. The computer-implemented method of claim 7, wherein the first safety notification is transmitted to the computing device associated with the first user upon determining that the computing device is within a threshold distance of the first safety hazard located on the first delivery route, wherein the computing device is located within a delivery vehicle operated by the first user.

11. The computer-implemented method of claim 7, wherein generating the plurality of safety notifications further comprises:
   generating a second safety notification for the one or more users; and
   transmitting the second safety notification to each of the one or more users prior to a start of each of the plurality of delivery routes.

12. The computer-implemented method of claim 11, wherein the second safety notification comprises a recommendation for the one or more users to implement a safety precaution determined for the geographical region.

13. The computer-implemented method of claim 7, further comprising determining a plurality of driving attributes of the one or more users, wherein the plurality of safety notifications are generated further based on the plurality of driving attributes.

14. The computer-implemented method of claim 13, wherein generating the plurality of safety notifications comprises, for at least a second user assigned to a second delivery route:
   determining at least a second safety hazard located on the second delivery route;
   determining that a driving attribute of the second user will increase the associated likelihood for the second safety hazard; and
   generating a second safety notification comprising at least an instruction to change the driving attribute.

15. The computer-implemented method of claim 7, further comprising:
   determining that at least a second user has not acknowledged a previously transmitted safety notification within a period of time; and
   in response, adjusting a delivery route assigned to the second user.

16. The computer-implemented method of claim 7, wherein generating the plurality of safety notifications comprises, for at least a second user assigned to a second delivery route:
   determining, after a start of the second delivery route, at least a second safety hazard located on the second delivery route; and
   refraining from generating a second safety notification comprising information associated with the second safety hazard upon determining that the second user will not encounter the second safety hazard located on the second delivery route.

17. The computer-implemented method of claim 16, wherein determining that the second user will not encounter the second safety hazard comprises:
   determining that the second safety hazard will be present at a location along the second delivery route for a period of time; and
   determining, based on the second delivery route, that the first user will be absent from the location within the period of time.

18. A non-transitory computer-readable storage medium having computer-readable program code embodied therewith, the computer-readable program code executable by one or more computer processors to perform an operation comprising:
   determining a plurality of safety hazards within a geographical region, each of the plurality of safety hazards having an associated likelihood of causing a safety incident;
   retrieving a plurality of delivery routes, each of the plurality of delivery routes indicating a travel path to one or more destination locations within the geographical region;
   generating a plurality of safety notifications for one or more users, based at least in part on the plurality of safety hazards within the geographical region and the plurality of delivery routes, comprising, for at least a first user assigned to a first delivery route:
   determining at least a first safety hazard located on the first delivery route;
   receiving location information from a computing device associated with the first user assigned to the first delivery route, the location information indicating a device location of the computing device and being generated by the computing device based on sensor information generated by the computing device; and
   generating a first safety notification based on the device location being within a threshold distance of the first safety hazard, the first safety notification comprising information associated with the first safety hazard; and
   transmitting the plurality of safety notifications, comprising transmitting the first safety notification to the computing device prior to the first user encountering the first safety hazard.

19. The non-transitory computer-readable storage medium of claim 18, wherein determining that the first user will encounter the first safety hazard comprises determining that the first safety hazard is a permanent safety hazard.

20. The non-transitory computer-readable storage medium of claim 18, wherein determining that the first user will encounter the first safety hazard comprises:
   determining that the first safety hazard will be present at a location along the first delivery route for a period of time; and
   determining, based on the first delivery route, that the first user will encounter the location within the period of time.

* * * * *